US006860673B2

(12) United States Patent
Zaps

(10) Patent No.: US 6,860,673 B2
(45) Date of Patent: Mar. 1, 2005

(54) ARRANGEMENT FOR AXIAL SLACK COMPENSATION

(75) Inventor: Klaus Zaps, Volkach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/437,470

(22) Filed: May 14, 2003

(65) Prior Publication Data
US 2003/0190103 A1 Oct. 9, 2003

Related U.S. Application Data

(63) Continuation of application No. PCT/EP01/13198, filed on Nov. 14, 2001.

(30) Foreign Application Priority Data

Nov. 17, 2000 (EP) .............................................. 00125136

(51) Int. Cl.[7] .............................................. F16C 43/04
(52) U.S. Cl. ........................ 403/344; 403/315; 411/353
(58) Field of Search ................................ 403/344, 315, 403/316, 317; 411/352, 353, 517, 518, 519, 521

(56) References Cited

U.S. PATENT DOCUMENTS

| 3,549,218 A |   | 12/1970 | Cagnon et al. ............. 308/163 |
| 4,952,093 A | * | 8/1990 | Murakami .................. 403/261 |
| 5,085,548 A | * | 2/1992 | Moyles ....................... 411/316 |
| 6,030,127 A | * | 2/2000 | Kang .......................... 384/416 |

FOREIGN PATENT DOCUMENTS

| DE | 19839407 | 3/2000 | ........... H02K/7/116 |
| EP | 0133527 | 2/1991 | ............. H02K/7/08 |
| FR | 1415584 | 9/1965 | ............. H02K/7/08 |
| FR | 2253940 | 10/1974 | .......... F16C/21/00 |
| WO | 02/41472 | 5/2002 | ............. H02K/7/08 |

OTHER PUBLICATIONS

International Search Report PCT/EP01/13198.

* cited by examiner

Primary Examiner—John R. Cottingham
(74) Attorney, Agent, or Firm—Baker Botts L.L.P.

(57) ABSTRACT

The arrangement has an axial securing element for fixing to the rotor shaft to enclose it at least over a tangential partial region, especially in the form of a spreader ring for fitting onto the rotor shaft, and a spring element pressing axially elastically against the stator part for axial play compensation as part of the securing element.

18 Claims, 4 Drawing Sheets

ARRANGEMENT FOR AXIAL SLACK COMPENSATION

CROSS-REFERENCE TO RELATED APPLICATION

This application is a continuation of co-pending International Application No. PCT/EP01/13198 filed Nov. 14, 2001 which designates the United States, and claims priority to European application number EP00125136.2 filed Nov. 17, 2000.

TECHNICAL FIELD OF THE INVENTION

The invention relates to an arrangement for axial slack compensation of a rotor shaft.

BACKGROUND OF THE INVENTION

From EP 0133 527 B2, an arrangement is known for limiting the axial slack of a rotor shaft, on a sliding bearing, of a motor drive relative to its housing part, whereby a shim washer, corresponding in each case to the measured axial slack, can be permanently fitted to the housing as an axial stop part.

Motor or motor gear arrangements with an elastic axial stop part in the form of an elastic element held at the housing end are known from FR-A-1 415 584 or FR-A-2 253 940.

SUMMARY OF THE INVENTION

The object of the invention is to provide axial slack compensation combined with reduced component and production costs and guaranteed operating safety, particularly with respect to mass-produced variable drives for vehicles.

This object is achieved in accordance with the invention by an arrangement for axial slack compensation in accordance with the following features: an axial securing element attachable to the rotor shaft and enclosing its circumference at least over a tangential part area, particularly in the form of an expanding ring that can be fitted onto the rotor shaft; and an elastic element elastically pressable axially against the stator part in the sense of compensation for the axial slack, as part of the securing element.

The production parts and assembly stages are reduced by the integration of a securing element, normally already present as an axial position stop securing element, particularly an expansion ring pressed into a radial recess in a rotor shaft, with an elastic element particularly in the form of elastic element arms.

The production cost can be further reduced if the securing element and the elastic element are parts of a component pressed as a single piece from sheet metal.

By means of an intermediate disk, torsionally resistant to the securing and elastic element, provided between the securing and elastic elements on one side and the stator part on the other, with axial stop buffers on one of its front faces, and a sliding face to stop against the front face provided on the stator part on the other, both a defined elastic course during the elastic deformation of the elastic element can be achieved and also a high degree of operating safety with long operating service times due to low wear.

BRIEF DESCRIPTION OF THE DRAWINGS

The invention and also advantageous embodiments of the invention explained in more detail in the drawing on the basis of exemplary embodiments. These are as follows.

DETAILED DESCRIPTION OF THE PREFERRED EMBODIMENTS

Figure 1:
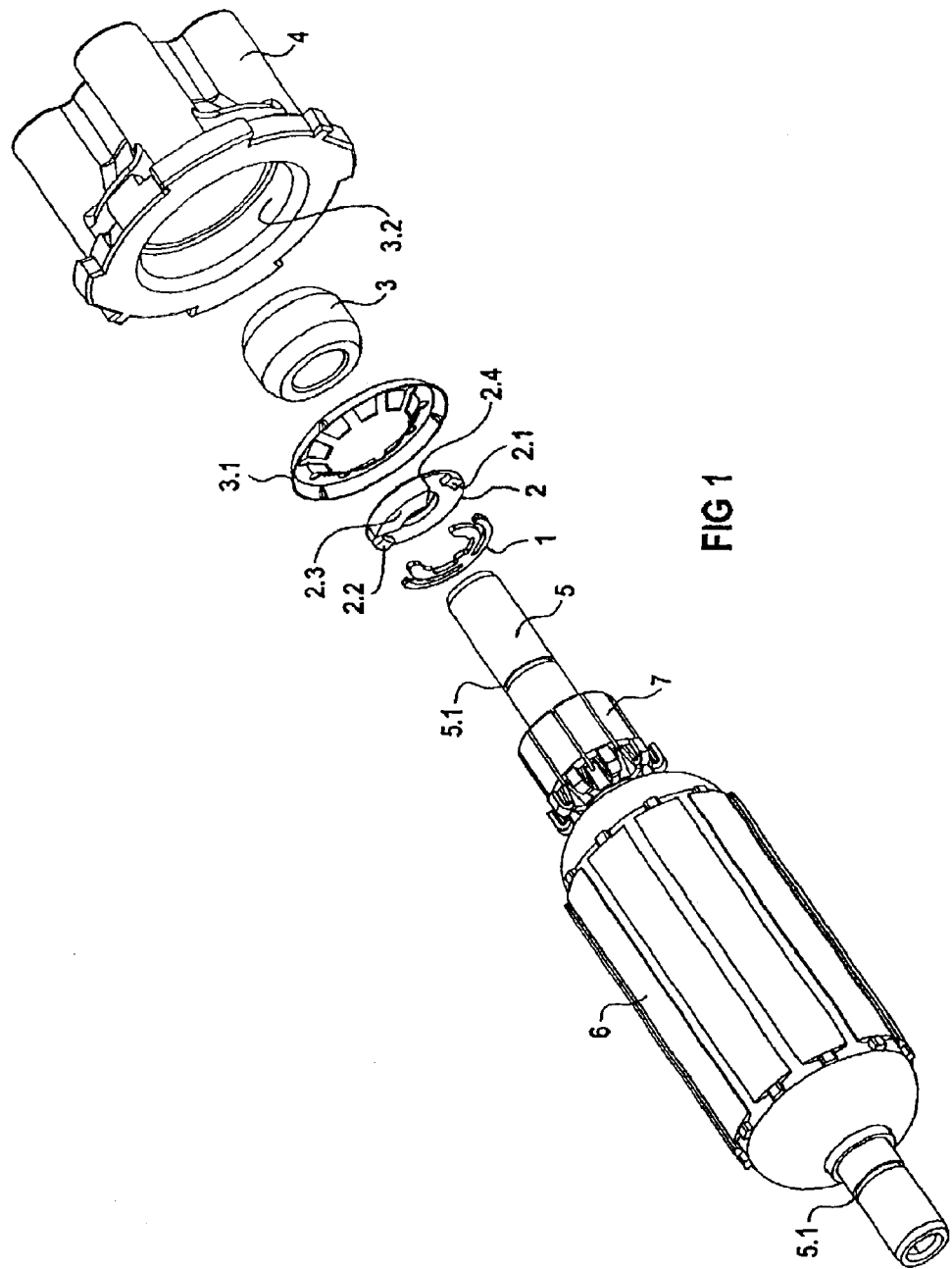
FIG. 1 A perspective exploded view of the rotor of a commutator motor with axial slack compensation with respect to the stator part in accordance with the invention.
Figure 2:
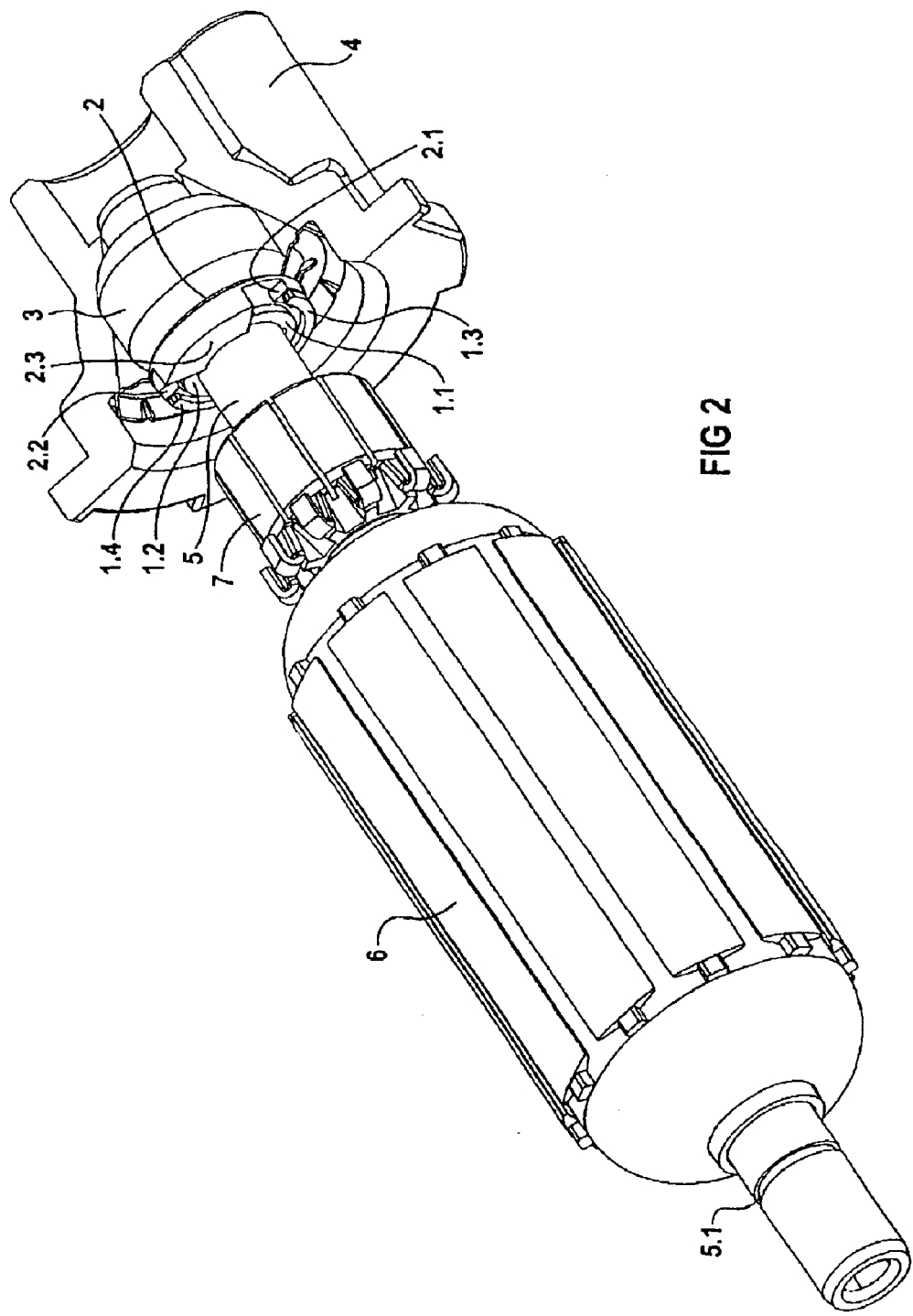
FIG. 2 An arrangement according to FIG. 1 in the assembled-for-operation position.

In a perspective exploded view, FIG. 1 shows a rotor with a rotor shaft 5 provided with an arrangement for axial slack compensation with respect to a stator part 4 in accordance with the invention and mounted on it a still unwound rotor pack 6 and a commutator 7. The rotor shaft 5 is mounted in a cap 3 that is adjustably held by a clamping collar 3.1 in the cap recess 3.2 of the stator part 4.

For axial support of the rotor shaft 5 against the stator part 4, a securing element 1 in the form of an expanding ring 1.1; 1.2 is used, that in this exemplary embodiment is axially located by engaging in a shaft recess in the form of an annular groove 5.1 and can also be tangentially located by clamping by means of radially attached expanding fingers 1.1 or 1.2.

For elastic compensation of the axial slack between the rotor shaft 5 and stator part 4, the securing element 1 according to the invention is formed as an elastic element 1.3; 1.4 and for this purpose has, for each expanding finger 1.1 or 1.2, concentric outer elastic limbs 1.3 or 1.4 respectively, each of which is connected in an axially elastic manner by one free end of the limbs and by its other limb end, via a yoke 1.5 as a single piece, to the expanding fingers 1.2 or 1.3 at the ends facing away from the free ends of the limbs.

An intermediate disk 2, moving relative to the rotor shaft 5 and rotated by the securing element 1, is fitted axially between the support at the elastic elements 1.3; 1.4, integrated with the security element 1, on one side and the support at the stator part 4, or at the cap bearing 3 retained by this, on the other side, and in an advantageous manner has a corresponding sliding face 2.4 at its front face facing towards the stator part 4 or cap 3, and a stop buffer 2.1; 2.2. projecting axially relative to its front face facing towards the securing element 1 or elastic element 1.3; 1.4, by means of which the elastic element 1.3; 1.4, particularly the free ends of its elastic limbs 1.3 or 1.4, can be elastically pushed away in an axial direction.

Figure 5:
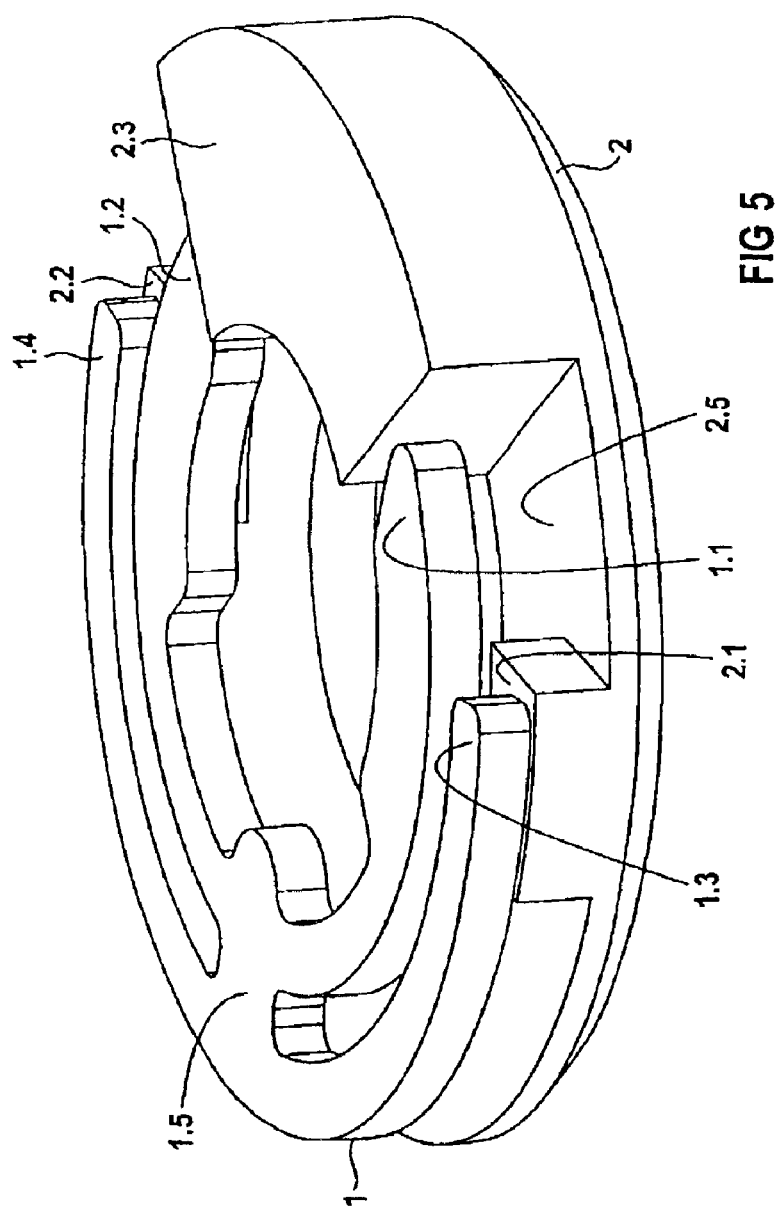
FIG. 5 An arrangement according to FIG. 4 showing a view in a different direction.

As can be seen particularly from FIG. 5, the maximum axial elastic course can be simply defined due to the axial height of the stop buffer 2.1 or 2.2 compared with the baseplate 2.5 or 2.6, acting during axial slack compensation as an axial stop for the expanding fingers 1.1 or 1.2, that in an undeflected state lie in one plane with the elastic limbs 1.3 or 1.4.

For mutual alignment of the intermediate disk 2 on one side and of the securing element 1 on the other side with the elastic limbs 1.3 or 1.4, particularly in a manner advantageous for a simple plug-in assembly, the intermediate disk 2 has an axially projecting alignment piece 2.3 that during operation is arranged between the free ends of the elastic limbs 1.1 and 1.2.

Figure 3:
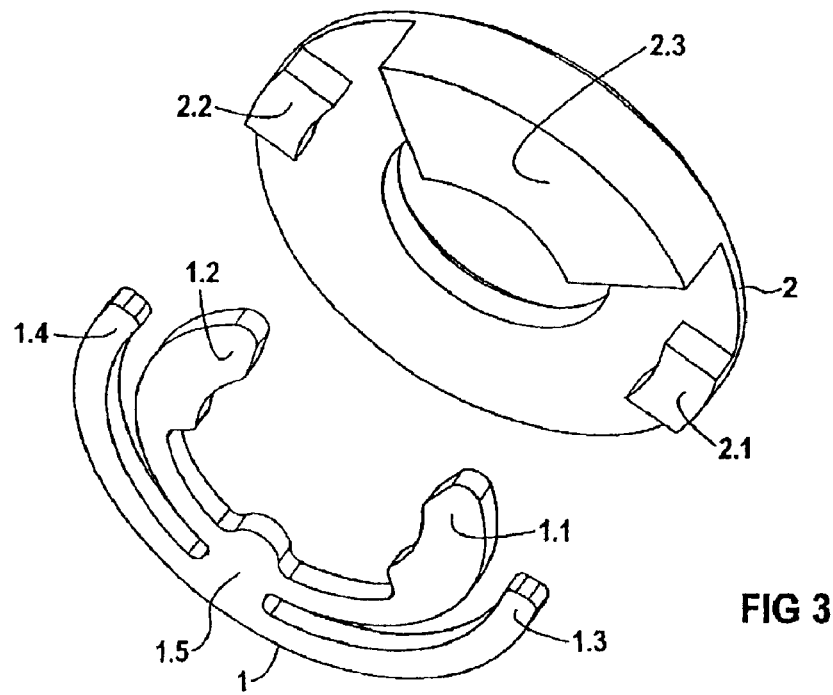
FIG. 3 A perspective exploded view of a securing element with an integrated elastic element in accordance with the invention and an associated intermediate disk.
Figure 4:
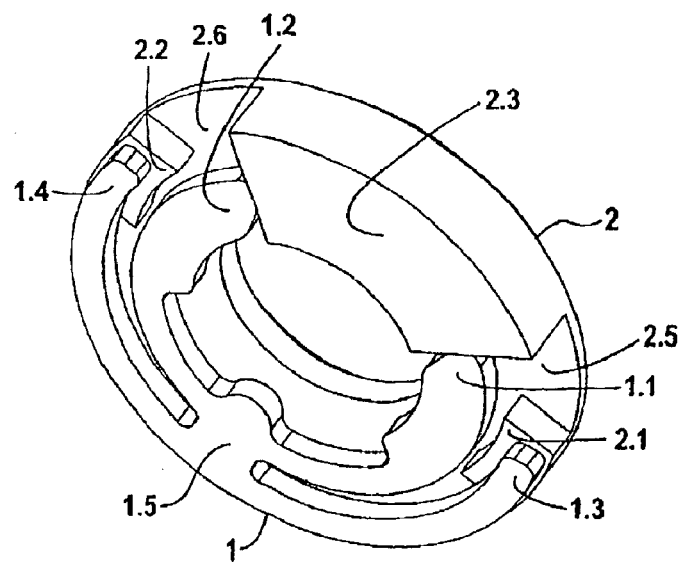
FIG. 4 An arrangement according to FIG. 3 in the assembled-for-operation position.

In a manner advantageous for production and assembly, as can be particularly seen from FIG. 3, the securing element 1 with its expanding fingers 1.1 or 1.2 and the elastic element 1.3; 1.4 with its elastic limbs 1.3 or 1.4 consist, by means of a yoke joint 1.5, of a part pressed as a single piece from sheet metal, and the intermediate disk 2 including the stop buffer 2.1 or 2.2 and the alignment piece 2.3 consists of a single-piece, particularly injection molded, plastic part.

To reduce the cost in terms of production and components used to compensate the axial slack of a rotor shaft 5 in relation to a stator part 4, an axial securing element 1 fixed onto the rotor shaft 5, particularly in the form of a radially attachable expanding ring 1.1; 1.2, is integrated with an elastic element 1.3; 1.4 which can be pressed axially in an elastic manner against the stator part 4 in order to compensate for axial slack, said elastic element in particular having the form of elastic limbs 1,3; 1.4 pressed in a single piece; an intermediate disk 2 with axial stop buffers 2.1; 2.2 which press against the elastic element 1.3; 1.4 on the one front face and one sliding surface 2.4 in relation to the stator part 4, especially the front surface of a sliding bearing 3, on the other front face guarantees an especially operationally reliable compensation of axial slack with a definable elastic course.

What is claimed is:

1. Arrangement for axial slack compensation of a rotor shaft relative to a stator part in which it is mounted, said arrangement comprising:

an axial securing element attachable to the rotor shaft and enclosing its circumference at least over a tangential part area in the form of an expanding ring that can be fitted onto the rotor shaft;

an elastic element elastically pressable axially against the stator part in the sense of compensation for the axial slack, as part of the securing element; and wherein the elastic element comprises at least one elastic limb, said limb having two ends, said limb supported by a free end to the stator part and is fixed at its other end to the securing element.

2. An arrangement in accordance with claim 1, wherein the elastic element is a single-piece component of the securing element.

3. An arrangement in accordance with claim 1, wherein the securing element and the elastic element are pressed as a single piece from sheet metal.

4. An arrangement in accordance with claim 1, wherein the securing element is axially attached relative to the rotor shaft by radial plug-in engagement into an annular groove of the rotor shaft.

5. An arrangement in accordance with claim 1, wherein the rotor shaft has an elastic-sprung axial support on a cap of a rotor shaft bearing in the form of a cap bearing, said rotor shaft bearing being housed by the stator part.

6. An arrangement for axial slack compensation of a rotor shaft relative to a stator part in which it is mounted, said arrangement comprising:

an axial securing element attachable to the rotor shaft and enclosing its circumference at least over a tangential part area in the form of an expanding ring that can be fitted onto the rotor shaft;

an elastic element elastically pressable axially against the stator part in the sense of compensation for the axial slack, as part of the securing element; and an intermediate disk that can be moved relative to the rotor shaft axially between the elastic element on one side and its support on the stator part on the other side, one face of said disk having a sliding face for the indirect or direct support of the elastic element on the stator part, and the other face of the intermediate disk as a pressure means for elastic deformation of the elastic element in the sense of axial slack compensation.

7. An arrangement in accordance with claim 6, further comprising an axial positive interlocking plug-in connection between the securing element and the intermediate disk, to provide a mutual rotational pickup and axial as well as tangential alignment.

8. An arrangement in accordance with claim 6, wherein the pressure means comprise stop buffers projecting axially opposite the intermediate disk.

9. An arrangement in accordance with claim 6, wherein the intermediate disk is plastic and includes the stop buffers and positive interlocking means as a single piece.

10. An assembly for compensating for the axial slack of a rotor shaft relative to a stator part, said assembly comprising:

an expandable ring for enclosing at least a tangential area of the circumference of the rotor shaft, said ring including an elastic element axially pressable against the stator parts, wherein the elastic element comprises at least one elastic limb, said limb having two ends, said limb supported by a free end to the stator part and fixed at its other end to the securing element.

11. An assembly in accordance with claim 10, wherein the elastic element and the ring are a single-piece component.

12. An assembly in accordance with claim 10, wherein the ring and the elastic element are pressed as a single piece from sheet metal.

13. An assembly in accordance with claim 10, wherein the ring is attached relative to the rotor shaft by engagement into an annular groove of said shaft.

14. An assembly in accordance with claim 10, further comprising a rotor shaft bearing with a cap, said cap having an axial support thereon, wherein said bearing is housed by the stator part.

15. An assembly in accordance with claim 10, further comprising an intermediate disk movable relative to the rotor shaft between the elastic element and its support on the stator part.

16. An assembly in accordance with claim 15, further comprising an axial positive interlocking connection between the securing element and the intermediate disk, to provide a mutual rotational pickup, axial alignment, and tangential alignment.

17. An assembly in accordance with claim 15, wherein one face of the disk acts as a pressure means and comprises stop buffers projecting axially outwardly.

18. An assembly in accordance with claim 15, wherein the intermediate disk is plastic, said disk comprising stop buffers and positive interlocking means, said buffers and interlocking means integrated into a single piece.

* * * * *